(12) United States Patent
Crorey, Jr.

(10) Patent No.: US 7,736,402 B2
(45) Date of Patent: Jun. 15, 2010

(54) BIOMASS GASIFIER

(76) Inventor: William G. Crorey, Jr., 12720 S. Carus Rd., Oregon City, OR (US) 97045

(*) Notice: Subject to any disclaimer, the term of this patent is extended or adjusted under 35 U.S.C. 154(b) by 386 days.

(21) Appl. No.: 11/774,731

(22) Filed: Jul. 9, 2007

(65) Prior Publication Data
US 2008/0014132 A1 Jan. 17, 2008

Related U.S. Application Data

(60) Provisional application No. 60/807,030, filed on Jul. 11, 2006.

(51) Int. Cl.
C10J 3/46 (2006.01)

(52) U.S. Cl. ............ 48/197 R; 48/210; 48/127.1; 48/127.9; 48/209; 48/212; 48/95

(58) Field of Classification Search ......... 48/197 R, 48/210, 127.9, 127.1, 209, 212
See application file for complete search history.

(56) References Cited

U.S. PATENT DOCUMENTS

| | | | |
|---|---|---|---|
| 404,209 A | 5/1889 | Loomis | |
| 2,665,200 A | 1/1954 | Kwauk | |
| 3,298,928 A | 1/1967 | Esterer | |
| 3,840,353 A * | 10/1974 | Squires | 48/203 |
| 3,868,817 A * | 3/1975 | Marion et al. | 60/781 |
| 3,920,417 A | 11/1975 | Fernandes | |
| 4,137,295 A * | 1/1979 | Tamers | 423/439 |
| 4,306,506 A | 12/1981 | Rotter | |
| 4,309,195 A | 1/1982 | Rotter | |
| 4,313,011 A | 1/1982 | Weil et al. | |
| 4,385,905 A | 5/1983 | Tucker | |
| 4,452,611 A | 6/1984 | Richey | |
| 4,568,271 A | 2/1986 | Mallek | |
| 4,597,771 A * | 7/1986 | Cheng | 48/77 |
| 4,702,179 A * | 10/1987 | Childs | 110/215 |
| 4,848,249 A | 7/1989 | LePori et al. | |
| 4,919,686 A | 4/1990 | Edwards | |
| 4,929,254 A | 5/1990 | Kooiman et al. | |
| 4,968,325 A | 11/1990 | Black et al. | |
| 5,026,403 A | 6/1991 | Michel-Kim | |
| 5,279,234 A | 1/1994 | Bender et al. | |
| 5,607,487 A | 3/1997 | Taylor | |
| 5,851,246 A | 12/1998 | Bishop et al. | |
| 5,858,033 A | 1/1999 | Hirayama et al. | |
| 6,126,907 A | 10/2000 | Wada | |
| 6,190,429 B1 | 2/2001 | Fujimura et al. | |
| 6,381,963 B1 | 5/2002 | Graham | |

(Continued)

*Primary Examiner*—Alexa D. Neckel
*Assistant Examiner*—Kaity V. Handal
(74) *Attorney, Agent, or Firm*—Chernoff, Vilhauer, McClung & Stenzel

(57) ABSTRACT

A biomass gasifier includes a wall structure defining a gasification chamber having a biomass inlet at an upper end thereof and a char outlet at a lower end. A generally U-shaped char tube has a base and first and second substantially vertical limbs. The first limb of the char tube is positioned to receive char from the char outlet of the gasification chamber and the second limb terminates upwardly at a level above the char outlet of the gasification chamber. A blower has a suction side connected to the second limb of the char tube for inducing a flow of gas through the gasification chamber and the char tube and also has a pressure side for connection to a consuming device.

7 Claims, 2 Drawing Sheets

U.S. PATENT DOCUMENTS

| | | |
|---|---|---|
| 6,615,748 B2 | 9/2003 | Sunter et al. |
| 6,647,903 B2 | 11/2003 | Ellis |
| 6,676,716 B2 | 1/2004 | Fujimura et al. |
| 6,786,943 B1 | 9/2004 | Jaccard et al. |
| 6,808,543 B2 | 10/2004 | Paisley |
| 6,830,597 B1 | 12/2004 | Green |
| 6,972,114 B2 | 12/2005 | Pope et al. |
| 7,040,240 B2 | 5/2006 | Goke et al. |
| 7,189,270 B2 | 3/2007 | Bryan et al. |
| 2002/0112403 A1 | 8/2002 | Pope et al. |
| 2002/0174812 A1 | 11/2002 | Shionoya et al. |
| 2005/0095183 A1 | 5/2005 | Rehmat et al. |
| 2006/0150510 A1 | 7/2006 | Hiltunen et al. |
| 2006/0265954 A1 | 11/2006 | Dogru et al. |

\* cited by examiner

BIOMASS GASIFIER

CROSS-REFERENCE TO RELATED APPLICATION

This application claims benefit of the date of filing of Provisional Application No. 60/807,030, the entire disclosure of which is hereby incorporated herein by reference for all purposes.

BACKGROUND OF THE INVENTION

This invention relates to a biomass gasifier.

Combustible gas can be obtained from agricultural crop waste and other biomass by a process known as gasification. FIG. 1 illustrates a conventional downdraft biomass gasifier, based on the disclosure in U.S. Pat. No. 6,647,903. The biomass is typically cellulose based and contains, in addition, volatile organic compounds (VOCs), tars and resins. Ground or chopped biomass is placed in a hopper 2 at the top of a gasification chamber 4 having a restricted outlet 8 at the bottom of the chamber and is ignited. A blower 10 draws air into the gasification chamber to support combustion of the biomass. The blower is controlled so that the rate of supply of oxygen is not sufficient for complete combustion of the biomass. As the biomass is heated, water and volatile compounds are released from the biomass, which forms a smoldering char composed primarily of carbon. The volatile compounds are oxidized, supplying heat to the biomass. Carbon in the char reacts with oxygen in reactions that produce carbon dioxide and carbon monoxide:

$$C+O_2 \rightarrow CO_2+heat$$

$$2C+O_2 \rightarrow 2CO+heat \tag{1}$$

Subsequently, carbon dioxide reacts with carbon in the char to produce carbon monoxide in a highly endothermic carbon reaction:

$$Heat+C+CO_2 \rightarrow 2CO \tag{2}$$

Gasification thus produces a gas that contains CO and can be used as fuel. The fuel gas is discharged at the pressure side of the blower 10. Incombustible ash is discharged downward from the gasification chamber through a char tube 12 that terminates in an ash pit. The ash that accumulates in the ash pit partially blocks the char tube and prevents excessive air entering the gasification chamber. As ash is removed from the vicinity of the lower end of the char tube, more char and ash can enter the char tube at its upper end, permitting fuel to enter the gasification chamber from the hopper.

The conventional downdraft gasifier shown in FIG. 1 is subject to disadvantage due to bridging of the fuel and char in the gasification chamber, preventing proper feeding of biomass to the zone at which the carbon reaction occurs. Further, in operation of the conventional downdraft gasifier, flow of gas through the char tube may create channels such that the gas passes through the char tube too rapidly to permit the carbon reaction (2) to occur. In addition, the composition of gas delivered to the carbon reaction zone may be inconsistent, because the temperature distribution in the gasification chamber is not consistent.

SUMMARY OF THE INVENTION

According to the present invention there is provided a biomass gasifier comprising a wall structure defining a gasification chamber having a biomass inlet at an upper end thereof and a char outlet at a lower end, a generally U-shaped char tube having a base and first and second substantially vertical limbs, the first limb of the char tube being positioned to receive char from the char outlet of the gasification chamber and the second limb terminating upwardly at a level above the char outlet of the gasification chamber, and a blower having a suction side connected to the second limb of the char tube for inducing a flow of gas through the gasification chamber and the char tube and also having a pressure side for connection to a consuming device.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 3:
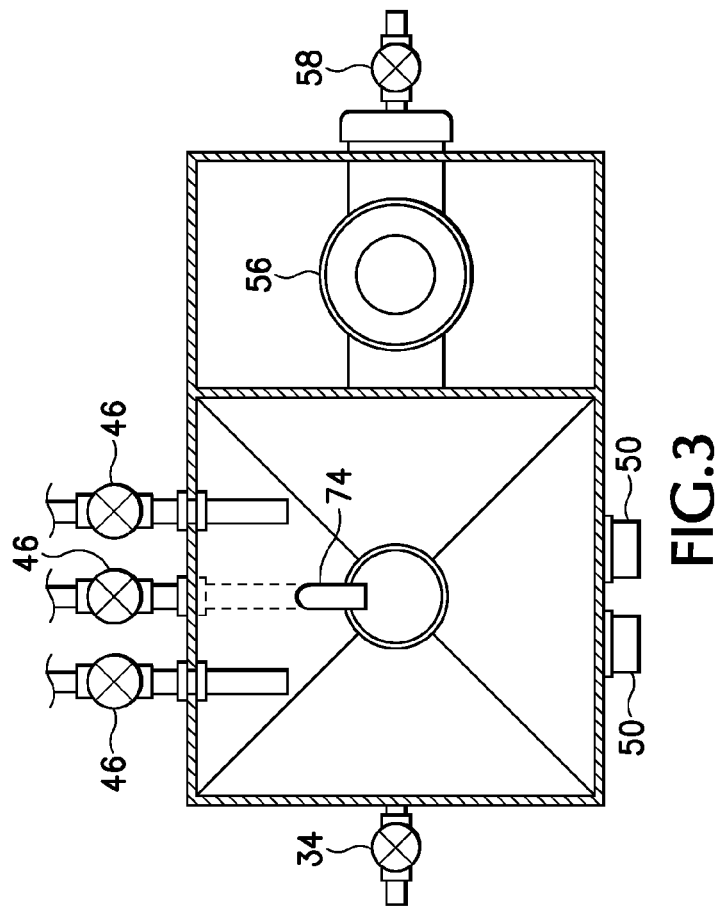
FIG. 3 is a sectional view taken on the line 3-3 in FIG. 2.
Figure 1:
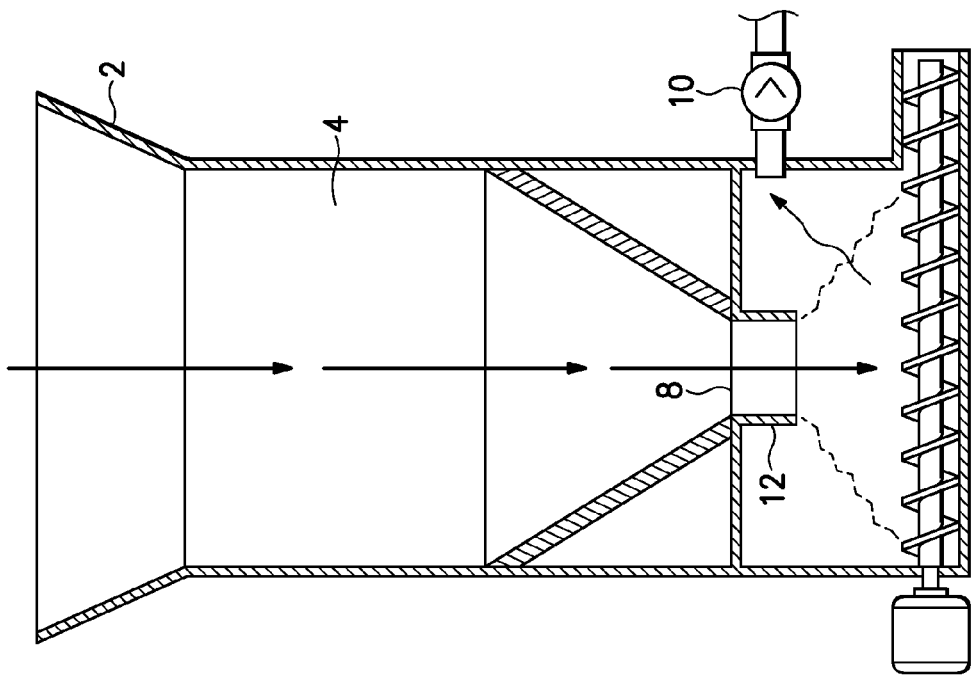
FIG. 1 is a vertical sectional view of a conventional gasifier.
Figure 2:
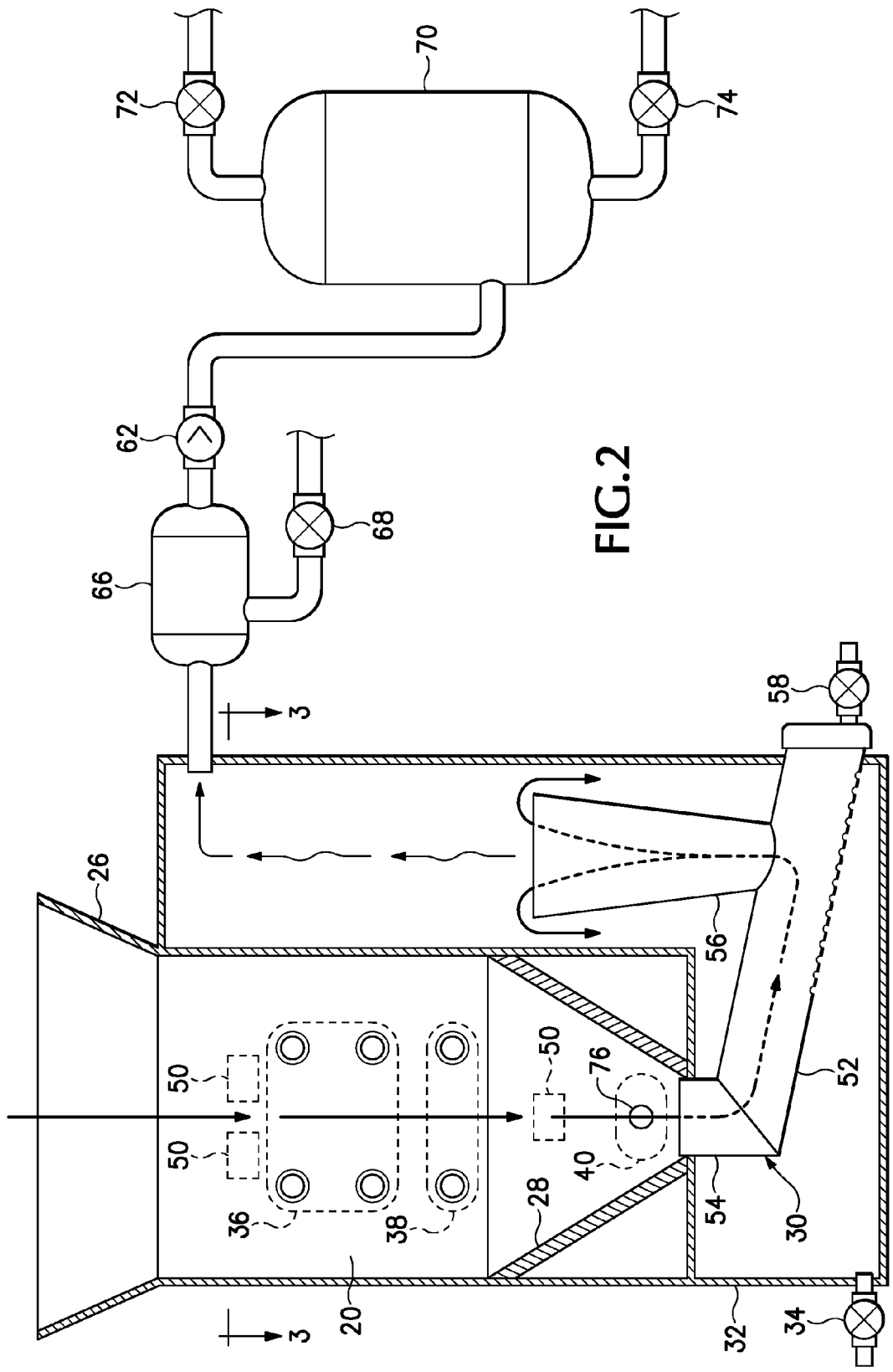
FIG. 2 is a vertical sectional view of a gasifier embodying the present invention.

The gasifier shown in FIGS. 2 and 3 has walls that surround a gasification chamber 20 and an adjacent gas exit chimney 24. At its upper end, the gasification chamber 20 is provided with a hopper 26 for feeding ground or chopped biomass to the gasification chamber and at its lower end, the gasification chamber is provided with a downwardly tapering funnel 28 that is lined with refractory material and leads to a generally U-shaped char tube 30 located in an ash receptacle 32 provided with a drain valve 34.

Air inlet tubes project into the gasification chamber in three zones, namely an upper zone 36 about the center of the chamber, an intermediate zone 38 somewhat below the center of the chamber, and a lower zone 40 just above the entrance to the char tube. The air inlet tubes open into the gasification chamber for introducing air into the gasification chamber and are provided with valves 46 for controlling flow of air into the tubes.

Vibrators 50 are provided for agitating the contents of the gasification chamber. A vibrator may comprise a motor that is attached to a wall of the gasification chamber and an out of balance weight that is rotated by the motor for vibrating the wall of the chamber. Alternatively, a vibrator may comprise a poker that projects into the gasification chamber and is driven to move in reciprocating or other periodic fashion by a motor located outside the chamber. Temperature probes (not shown) may be provided in the gasification chamber to enable an operator to monitor changes in temperature at the different levels in the gasification chamber.

The char tube 30 has an inclined base 52, one vertical limb 54 extending upward from the base into the lower end of the funnel 28 and an opposite vertical limb 56 extending upward from the base into the chimney 24 and terminating at above the lower end of the funnel. The inclined base of the char tube extends downward from the lower end of the limb 54 to a location beyond the lower end of the limb 56 and at which the char tube is provided with a controllable outlet valve 58. The base 52 of the char tube is formed with small weep holes for draining water from the char tube into the ash receptacle 32.

The gas exit chimney is connected to the suction side of a blower 62 via a suction tank 66 provided with a drain valve 68. The pressure side of the blower 62 is connected to a pressure tank 70, having a gas outlet connected through a valve 72 to one or more consuming devices (not shown) and also having a drain outlet 74. The blower 62 induces a flow of gas from the gasification chamber through the char tube and the gas exit chamber and delivers the gas to the pressure tank 70.

Operation of the gasifier is started by loading ground or chopped cellulose-based biomass, such as agricultural waste, into the gasification chamber by way of the hopper to a suitable level, which may be above the lower end of the hopper, inserting a heat source into the gasification chamber, and energizing the vibrators and the blower. The heat source may be, for example, a propane torch that is inserted into the gasification chamber by way of one of the air inlet tubes. The heat source ignites the biomass. The blower induces a flow of air into the gasification chamber through the air inlet tubes, onward through the char tube and the gas exit chamber. The air flow induced by the blower provides oxygen to support combustion of the biomass.

The temperature distribution in the gasification chamber depends on the distribution of the supply of air to the gasification chamber. If the temperature at a given location in the gasification chamber is sufficient for the biomass to smolder, supply of air to that location will accelerate the exothermic oxidation reaction, thus increasing the temperature, whereas if the supply of air is discontinued the reaction is starved of oxygen and the smolder may be extinguished. By providing several air inlet tubes at different levels in the gasification chamber, it is possible to control the temperature distribution in the gasification chamber.

After first igniting the biomass, the air supply valves 46 are controlled to supply air principally through the bottom air inlet tube 76 to promote the combustion reaction in the lower zone 40, just above the entrance to the char tube 30. Radiant heat from the reacting char heats the biomass that is above the lower zone 40. Sufficient air is supplied to the upper zone 36 that the temperature in the upper zone attains a sufficient level that water and VOCs present in the biomass are vaporized. Some of the VOCs may be combusted in oxygen present in the upper zone. The temperature established in the intermediate zone 38 is sufficient to complete evaporation of volatile compounds and tars and may also complete the combustion of volatile compounds and partially combust the tars and resins, leaving a hot carbon char.

The heat generated in the intermediate and lower zones is sufficient to sustain the reactions in those zones and to supply heat to the biomass in the upper zone for evaporating water and low temperature volatile compounds and partial consumption of those compounds.

In the lower zone 40, sufficient air is supplied that the temperature reaches a level of 1370° C. (2500° F.) or higher. In this zone, any remaining tars and resins are incinerated such that the major components of the gas entering the char tube are CO, $CO_2$ and water vapor, both from the biomass and from the incoming air. Some of the carbon in the char is oxidized, leaving a residue of incombustible ash containing some unreacted carbon.

In the char tube, the carbon dioxide reacts with previously unreacted carbon to generate carbon monoxide in accordance with reaction (2). Some water vapor also reacts with the carbon in the char tube:

$$\text{Heat} + C + H_2O \rightarrow CO + H_2 \qquad (3)$$

Both these reactions are highly endothermic and accordingly the temperature of the gas falls from over 1300° C. to about 57° C. (135° F.). Water vapor that does not react in accordance with reaction (3) condenses at the bottom of the char tube. Some of the condensed water drains into the ash pit through the weep holes in the char tube and water that does not drain into the ash pit drains down the char tube to the drain valve 58, which is periodically opened to allow the water to drain from the char tube.

The char that is created by the reactions described above is finely divided and behaves substantially in the manner of a liquid. The char fills the base and the taller limb of the char tube to a height above the inlet to the shorter limb 54. The gas flow leaves the gasification chamber through the char tube by permeating through the bed of finely divided char (and ash that may also be present). Because of the nature of the char and ash, gas channels are not created in the base of the char tube.

The taller limb 56 of the char tube diverges upward, allowing expansion of the gas into the gas exit chimney. The flow of gas is sufficiently vigorous that the most of the ash is entrained in the gas flow leaving the char tube. Some ash settles from the gas flow into the ash pit. The ash that falls into the ash pit forms a slurry with water that drains from the char tube. The ash slurry can be removed from the ash pit through the drain valve 34. Most of the ash that is entrained in the gas flow is carried into the suction tank 66, in which it settles. Residual water vapor condenses in the suction tank. Ash slurry can be removed from the suction tank by the drain valve 68.

The blower 62 draws a steady flow of air (containing insufficient oxygen for complete combustion of the biomass) into the gasification chamber with the contents of the hopper and gasification chamber serving as a throttle so that air enters preferentially through the air inlet tubes. Due to the reactions that occur in the gasification chamber, the composition of the gas progressively changes as oxygen is removed and reaction products are added to the gas flow.

Establishing three distinct zones of operation in the gasification chamber is important to ensuring that the gas delivered to the char tube has a consistent composition. Thus, by progressively heating the biomass and incinerating tars and resins, the only reaction that is needed at the third zone is oxidation of the carbon in the char so that the gas entering the char tube contains only carbon monoxide, carbon dioxide and water vapor. Remaining water vapor and entrained ash precipitate from the gas in the suction tank 66, and accordingly the gas delivered to the pressure tank 70 is clean and dry. The drain valve 74 can be used to remove liquid or solid material from the pressure tank should the need arise.

The vibrators keep the biomass and char in an agitated state, preventing formation of bridges and gas channels, and It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of the claims beyond the literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A method of operating a gasifier that includes a wall structure defining a gasification chamber having a fuel inlet at an upper end thereof and an outlet at a lower end, a generally U-shaped tube having a base and first and second substantially vertical limbs, the first limb of the tube being positioned to receive material from the outlet of the gasification chamber and the second limb terminating upwardly at a level above the outlet of the gasification chamber, said method comprising:

supplying biomass to the gasification chamber by way of the fuel inlet, initiating combustion of biomass in the gasification chamber, whereby water present in the biomass evolves as water vapor, inducing a flow of gas through the gasification chamber and the U-shaped tube, whereby air is drawn into the gasification chamber and supports combustion of biomass in the gasification chamber to form $CO_2$, restricting supply of air to the gasification chamber such that the supply of air is insufficient to permit complete combustion of biomass in the gasification chamber, whereby char is formed in the gasification chamber and substantially fills the base of the U-shaped tube, and char in the U-shaped tube reacts endothermically with water vapor and $CO_2$ to form CO and $H_2$.

2. A method according to claim 1, comprising introducing air into the gasification chamber by way of air inlet tubes projecting into the gasification chamber.

3. A method according to claim 1, comprising agitating the contents of the gasification chamber.

4. A method according to claim 1, wherein the base of the generally U-shaped tube is inclined downward from the first limb to the second limb and the method further comprises selectively removing ash slurry from the base of the generally U-shaped tube.

5. A method according to claim 1, comprising supplying biomass to the gasification chamber by way of a hopper at the upper end of the gasification chamber.

6. A method according to claim 1, comprising collecting solid combustion product that overflows the second limb of the generally U-shaped tube in an ash box.

7. A method according to claim 6, comprising selectively removing ash slurry from the ash box.

\* \* \* \* \*